(12) United States Patent
Yamamoto

(10) Patent No.: US 6,430,376 B1
(45) Date of Patent: Aug. 6, 2002

(54) IMAGE PROCESSING APPARATUS, IMAGE OUTPUT DEVICE, AND IMAGE PROCESSING SYSTEM

(75) Inventor: Hiroyasu Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/586,750

(22) Filed: Jun. 5, 2000

(30) Foreign Application Priority Data

Jun. 4, 1999 (JP) .......................................... 11-158158

(51) Int. Cl.[7] .............................................. G03B 17/48
(52) U.S. Cl. ...................................... 396/429; 355/40
(58) Field of Search ............................... 355/40, 39–42; 396/311, 429

(56) References Cited

U.S. PATENT DOCUMENTS

| | | | | |
|---|---|---|---|---|
| 5,327,265 A | * | 7/1994 | McDonald | 358/527 |
| 5,936,709 A | * | 8/1999 | Yamamoto | 355/40 |
| 6,157,435 A | * | 12/2000 | Slater | 355/40 |
| 6,219,129 B1 | * | 4/2001 | Kinjo et al. | 355/40 |
| 6,243,504 B1 | * | 6/2001 | Kruppa | 382/318 |

* cited by examiner

Primary Examiner—David M. Gray
(74) Attorney, Agent, or Firm—Sughrue Mion, PLLC

(57) ABSTRACT

It is an object of the invention to provide an image processing apparatus, wherein even when an image recorded on a recording medium is once recorded on a recording material and this is recorded over again, an appropriate printing can be performed. An image ID is added to image data by means of an image ID data issuance device and is stored in a memory. Display image data obtained by performing every kind of image processing in an image processing section are stored in a memory, and recording image data obtained by performing every kind of in the image processing section are stored in a memory and are outputted to an output device before performing printing on the basis of the recording image data. A bar code representing the image ID is printed on a print in a bar code printer. At the time of reprinting, the bar code is read by means of a bar code reader so that the display image data and the recording image data corresponding to the image ID are read out.

32 Claims, 10 Drawing Sheets

IMAGE PROCESSING APPARATUS, IMAGE OUTPUT DEVICE, AND IMAGE PROCESSING SYSTEM

BACKGROUND OF THE INVENTION

The present invention relates to an image processing apparatus, an image output device, and an image processing system, and more particularly to an image processing apparatus by which predetermined image processing is performed on image data, an image output device for outputting an image on the basis of the image data on which the image processing is performed, and an image processing system including the image processing apparatus and the image output device.

Conventionally, a digital laboratory system has been proposed wherein a film image recorded on a photosensitive material such as a photographic film (hereafter, simply called a photographic film) is photo-electrically read, the image data obtained by this reading is subjected to various kinds of image processing, laser light is modulated on the basis of the image data after the image processing, and a sensitive material such as photographic paper is scanned and exposed so as to form a finished print. In this digital laboratory system, the image quality of a recording image can be freely controlled by image processing of the image data, as compared with a conventional photographic processing system in which a film image is recorded on photographic paper by face exposure. When so-called hypertone processing, in which gradation of low frequency components of an image is compressed, is performed; for example, for a film image photographed using flash, a film image in which a backlit scene is photographed, and the like, a recorded image without jumps and crushing in the gradation of a background area can be obtained without softening the entire image.

In a case in a digital laboratory system in which the finishing of a print is not appropriate, the film image of the photographic film is read out once more so as to perform a reprinting in which the printing is performed again. There are methods for reprinting. In one method, image processing conditions are determined once again from the data obtained by reading the film image for the second time, and the image processing conditions are corrected by performing a positive verification before performing printing. In another method, image processing conditions of an initial print (hereafter, referred to as a first print), at the time when an inappropriate print is finished, are stored, and the image processing conditions are read out so that corrections are provided by a positive verification before performing printing.

In performing reprinting, corrections on image processing conditions by an operator are usually performed by converting a correction amount for an inappropriate first print into a density key, a CMY key and the like and performing a key input in accordance with judgement results. For example, judgement is made such that the density key is incremented, or one CMY key is deducted, while observing the first print. At this time, if the image processing conditions at the time of reprinting do not correspond to the image processing conditions at the time of making the first print, a correction amount by a key input becomes inappropriate. Specifically, in a digital laboratory system in which image processing conditions are determined from image data of one roll of photographic film, at a time of reprinting in which a piece film, cut to a predetermined number of frames, is processed as a unit, image processing conditions are sought from image data of the predetermined number of film images recorded on a predetermined piece film, thereby causing a problem of there being a strong possibility of not corresponding to the image processing conditions at the time of making the first print.

In order to solve such a problem, a method in which image processing conditions of the time of making a first print are stored, read out at the time of reprinting are employed has been proposed. However, there is a necessity of performing reading again of the photographic film containing the frame in question, and the work of retrieving and reading out the processing conditions of the image processing at the time of making the first print is complicated (particularly, this is obvious in a case in which a large amount of images are processed at high speed), thereby causing a problem that the workload at the time of reprinting is high.

SUMMARY OF THE INVENTION

The present invention was developed in order to solve the aforementioned problems, and it is an object of the present invention to provide an image processing apparatus, an image output device, and an image processing system wherein even when an image recorded on a recording medium is once recorded on a recording material and then is recorded over again, the workload can be reduced, and appropriate printing can be efficiently performed.

In order to accomplish the object, the invention of the first aspect includes an image processing apparatus, comprising: an image ID adding section which adds an image ID that identifies image data to the image data; an image processing section which determines a processing condition of predetermined image processing, performs the predetermined image processing on the image data and converts the image data to output image data which includes display image data and recording image data; a display section which displays an image on the basis of the display image data; a recording section which records an image onto a recording material on the basis of the recording image data; a memory section which stores the output image data in accordance with the image ID; an image ID recording section which records the image ID that is added by the image ID adding section onto the recording material on which the image is recorded by the recording section; and an image ID input section for inputting the image ID recorded on the recording material on which the image, which is to be recorded again, is recorded.

In the invention of the first aspect, since the image ID adding section adds an image ID for distinguishing image data (for example, the image data obtained by reading an image recorded on a recording medium such as a photosensitive material, the image data obtained by reading an image from a recording medium such as a CD-ROM, or the like) even when image data of a large number of images exist, image data of respective image can be distinguished on the basis of the image ID. The image processing section converts the image data to output image data including display image data and recording image data by deciding a processing condition of a predetermined image processing and performing the image processing with regard to the image data. Since the display section displays the image of the time after the image processing on the basis of the display image data, the image of the time after the image processing by the image processing section can be confirmed by an operator seeing the image displayed. The recording section records an image on a recording material such as a sheet of photographic paper on the basis of the recording image data. The memory section stores the output image data including the display image data and the recording image data while making the output image data correspond to the image ID added by the image ID adding section. The image ID recording section records the image ID added by the image ID adding section on a reverse face or the like of the recording material on which an image is recorded by the recording section, the image ID input section inputs the image ID recorded by the image ID recording section on the recording material on which the image to be recorded again is recorded.

By constituting the image processing apparatus as described above, after an image recorded for example on a photosensitive material is once recorded on a recording material, when the same image is desired to be recorded once more by a reason that the finishing of the first image recorded is not appropriate or the like, since an image ID recorded on the recording material on which the first image (the image to be recorded again) is recorded (hereafter, referred to a first print) is inputted by means of the image ID input section, the display image data and the recording image data can be easily read out by means of the memory section while using the image ID inputted as a key, and the image ID can be utilized when the same image is recorded on the recording material over again from the image data read (hereafter, referred to a reprinting). When reprinting is performed, there is no need of preparing again the photosensitive material on which the image is recorded, and the recording image data and display image data employed at the time of making the first print can be easily acquired when the first print is available. Thus, the work for reading the image recorded on the recording material again can be omitted, and reprinting working hours can be shortened. That is, the reprinting work can be performed efficiently.

When reprinting is performed by the reason that the finishing of the first image is not appropriate or the like, it is general that the correction amount for correcting the processing condition of a predetermined image processing so as to make the finishing appropriate is decided by an operator while taking the finishing of the first image as a standard. For this case, in the invention according to the first aspect, since the image data read out from the memory section correspond to the image data employed at the time of making the first print, an image with an appropriate finishing can be obtained by correcting the image data according to the correction amount decided while taking the finishing of the first print as a standard and performing recording of an image.

The invention of the second aspect is characterized in that in the invention of the first aspect, the image data is image data that is obtained by reading an image recorded on a recording medium.

By the invention of the second aspect, in the invention of the first aspect, the image data obtained by reading the image recorded on a recording medium (for example, a photosensitive material such as a photographic film) can be employed.

The invention of the third aspect is characterized in that the invention of the first aspect further comprising a control section which, when the image ID is inputted from the image ID input section, outputs the output image data which is stored in correspondence with the inputted image ID in the memory section, the display image data of the output image data being outputted to the display section and the recording image data of the output image data being outputted to the image processing section.

By the invention of the third aspect, in the invention of the first aspect, the control section outputs the display image data among the output image data stored in the memory section while being made correspond to the image ID inputted to the display section and outputs the recording image data to the image processing section, when the image ID is inputted from the image ID input section (for example, when reprinting is performed by the reason that the finishing of an image is not appropriate or the like as described above). Accordingly, it is possible to display the same image as that of the time of making the first print. Further, for example, it is possible to perform a correction with regard to the processing condition of the image processing of the time of making the first print and perform image processing on a processing condition corrected while seeing the image recorded on the display section, the image recorded on the recording material, and the like.

The invention of the forth aspect, in the invention of the third aspect, further comprising an input section for inputting information for amending the processing condition of the predetermined image processing on the basis of an image displayed at the display section, wherein, when the recording image data is inputted, the image processing section amends the recording image data in accordance with the information inputted via the input section, and outputs the recording image data.

By the invention of the forth aspect, in the invention of the third aspect, information for correcting the processing condition of the predetermined image processing can be inputted by means of the input section on the basis of an image displayed on the display section. Further, since the image processing section corrects and outputs the recording image data according to correction information with regard to the processing condition of the image processing inputted via the input section while an operator sees the image displayed on the display section and the image recorded on the recording material when the recording image data are input (for example, when reprinting is performed by the reason that the finishing of an image is not appropriate or the like as described above), the recording image data processed on an appropriate processing condition can be obtained.

The invention of the fifth aspect is an image processing apparatus, comprising: a reading section which reads an image recorded on a recording medium; an image ID adding section which adds an image ID that identifies image data, which is obtained by the reading section reading the image recorded on the recording medium, to the image data; an image processing section which determines a processing condition of predetermined image processing, performs the predetermined image processing on the image data and converts the image data to output image data which includes display image data and recording image data; a display section which displays an image on the basis of the display image data; a recording section which records an image onto a recording material on the basis of the recording image data; a memory section which stores the processing condition, which the image processing section employed when performing the predetermined image processing, and the display image data in correspondence with the image ID; an image ID recording section which records the image ID that is added by the image ID adding section onto the recording material on which the image is recorded by the recording section; and an image ID input section for inputting the image ID recorded on the recording material on which the image, which is to be recorded again, is recorded.

By the invention of the fifth aspect, since the reading section reads an image recorded on a recording medium and the image ID adding section adds an image ID for distinguishing image data obtained by reading of the reading section, even when image data of a large number of images exist, distinguishing individual image data can be performed on the basis of the image ID. The image processing section converts the image data to output image data including display image data and recording image data by deciding a processing condition of a predetermined image processing and performing the predetermined image processing with regard to the image data. Since the display section displays the image of the time after image processing on the basis of the display image data, the image of the time after image processing by the image processing section can be confirmed by an operator seeing the image displayed. The recording section records the image on a recording material on the basis of the recording image data. The memory section stores the processing condition that the image processing section employed when performing the predetermined image processing and the display image data while making the processing condition and the display image correspond to the image ID added by the image ID adding section. The image ID recording section records the image ID added by means of the image ID adding section on the reverse face of the recording material on which the image is recorded by means of the recording section, and the image ID input section inputs the image ID recorded by the image ID recording section on the recording material on which the image to be recorded again is recorded.

By constituting the image processing apparatus as described above, after an image recorded on a photosensitive material is once recorded on a recording material, for example, when the same image is wanted to be recorded over again by the reason that the finishing of the initial image recorded is not appropriate or the like, since the image ID recorded on the recording material (first print) on which the first image (the image to be recorded again) is recorded is inputted by the image ID input section, the display image data of the time after image processing performed at the time of making a first print and the processing condition of the image processing employed when the image processing section performs the predetermined image processing can be read out easily by the memory section while using the image ID inputted as a key.

That is, although the recording image data are not stored in the memory section in the invention of the fifth aspect, the same recording image data as that of the time of making the first print can be obtained by reading the image recorded on the recording medium such as a photographic film and corresponding to the image ID and by performing the predetermined image processing on the processing condition read out for the image data obtained by reading. At the time of reprinting, the display image data and the processing condition of the time of making the first print can be acquired if the first print is available, and reprinting can be performed by reading the image recorded on the recording material corresponding to the image ID by the reading section, thereby enabling easy reprinting work.

When reprinting is performed by the reason that the finishing of the first image is not appropriate or the like as described above, it is general that the correction amount for correcting the processing condition of the predetermined image processing so as to make the finishing appropriate is decided by an operator while taking the finishing of the first image as a standard. In the invention of the fifth aspect, since the processing condition and the display image data read through the memory section correspond to the processing condition and the display image data employed at the time of making the first print and through the processing condition the recording image data employed at the time of making the first print can be reproduced, an image of appropriate finishing can be obtained by correcting the image data according to the decided correction amount while taking the finishing of the first print as a standard and by recording the image. Further, since the processing condition of the image processing employed at the time of performing the predetermined image processing by the image processing section is stored instead of storing the recording image data in the memory section, the memory capacity of the memory section can be reduced.

The invention of the sixth aspect, in the invention of the fifth aspect, further comprising a control section which, when the image ID is inputted from the image ID input section, outputs the display image data which is stored in correspondence with the inputted image ID in the memory section to the display section and outputs the processing condition which is stored in correspondence with the inputted image ID in the memory section to the image processing section.

By the invention of the sixth aspect, in the invention of the fifth aspect, when the image ID is read by means of image ID reading section (for example, when reprinting is performed by the reason that the finishing of an image is not appropriate or the like as described above), the control section outputs display image data stored in the memory section while being made correspond to the image ID inputted to the display section and outputs the processing condition of the time when the image processing section performs the predetermined image processing (at the time of making the first print) to the image processing section. Therefore, the same image as that of the time of making the first print can be displayed. Further, for example, correction can be performed for the processing condition of the image processing at the time of making the first print while seeing the image displayed on the display section, the image recorded on the recording material, and the like, and image processing can be performed on the corrected processing condition for the image data obtained by the reading section reading the image recorded on the recording medium corresponding to the image ID.

The invention of the seventh aspect, in the invention of the fifth aspect, further comprising an input section for inputting information for amending the processing condition of the predetermined image processing on the basis of an image displayed at the display section, wherein, when the image data is inputted and the processing condition is inputted, the image processing section amends the inputted processing condition in accordance with the information inputted via the input section and converts the inputted image data to recording image data on the basis of the amended processing condition.

By the invention of the seventh aspect, in the invention of the fifth aspect, information for correcting the processing condition of the image processing can be inputted via the input section on the basis of the image displayed on the display section. The image processing section corrects the processing condition inputted (the processing condition of the time of making the first print) according to the information inputted via the input section and converts the image data to the recording image data for example while the image displayed on the display section, the image recorded on the recording material, and the like are seen, when the image data are inputted and the processing condition of the image processing employed when the predetermined image processing is performed by the image processing section (at the time of making the first print) is inputted (for example, when reprinting is performed by the reason that the finishing of an image is not appropriate). Thus, the recording image data processed on an appropriate processing condition can be obtained.

The invention of the eighth aspect is the image processing apparatus of the first aspect, wherein the image ID recording section is a printer which prints the image ID, and the image ID input section is a reader which inputs by reading the image ID that was printed., in the invention of the first aspect, the image ID recording section is a printer which prints the image ID, and the image ID input section is a reader which inputs by reading the image ID that was printed.

The invention of the ninth aspect is the image processing apparatus of the fifth aspect, wherein the image ID recording section is a printer which prints the image ID, and the image ID input section is a reader which inputs by reading the image ID that was printed., in the invention of the first aspect, the image ID recording section is a printer which prints the image ID, and the image ID input section is a reader which inputs by reading the image ID that was printed.

By the invention of the eighth aspect or the ninth aspect, in the invention of the first aspect or the fifth aspect, the image ID recording section contains a printer printing the image ID, and the image ID can be inputted by printing the image ID added by the image ID adding section for example on the reverse face of the recording material or the like and reading the image ID printed by the reader.

For example, the image ID can be added on the recording material by printing a bar code on the reverse face of the recording material or the like by the printer printing a bar code, and the image ID recorded on the recording material can be inputted by the bar code reader reading the bar code printed.

The invention of the tenth aspect is the image processing apparatus of the first aspect, wherein the image ID recording section is a character string printer which prints a character string that represents the image ID, and the image ID input section is an input device for inputting the image ID on the basis of the character string that was printed., in the invention of the first aspect, the image ID recording section is a character string printer which prints a character string that represents the image ID, and the image ID input section is an input device for inputting the image ID on the basis of the character string that was printed.

The invention of the eleventh aspect is the image processing apparatus of the fifth aspect, wherein the image ID recording section is a character string printer which prints a character string that represents the image ID, and the image ID input section is an input device for inputting the image ID on the basis of the character string that was printed., in the invention of the first aspect, the image ID recording section is a character string printer which prints a character string that represents the image ID, and the image ID input section is an input device for inputting the image ID on the basis of the character string that was printed.

By the invention of the tenth aspect or the eleventh aspect, in the invention of the first aspect or the fifth aspect, the image ID can be inputted by printing a character string representing the image ID added by the image ID adding section for example on the reverse face of the recording material or the like by the character string printer printing a character string and by performing inputting on the basis of the printed character string via the input device (for example, a key board).

The invention of the twelfth aspect is the image processing apparatus of the first aspect, wherein the display image data stored in the memory section has a lower resolution than the recording image data.

The invention of the thirteenth aspect is the image processing apparatus of the fifth aspect, wherein the display image data stored in the memory section has a lower resolution than the recording image data.

By the invention of the twelfth aspect or the thirteenth aspect, in the invention of the first aspect or the fifth aspect, the capacity of the memory section can be reduced by making the resolution of the display image data stored in the memory section lower than that of the recording image data.

The invention of the fourteenth aspect is the image processing system of the fifth aspect, wherein the image processing apparatus further comprises a display image transmission section which transmits, of the output image data, display image data for displaying the image, and the image ID input device further comprises a display section which displays an image on the basis of the display image data transmitted by the display image transmission section.

By the invention of the fourteenth aspect, in the invention of the fifth aspect, a display image transmission section transmitting display image data for displaying the image among the output image data is further provided in the image processing apparatus, and a display section displaying an image on the basis of the display image data transmitted by the display image transmission section is further provided in the image ID input device. Thus, since the image stored in the memory section corresponding to the image ID inputted by the image ID input section and transmitted by the transmission section and the communication section to the image processing apparatus can be displayed on the display section of the image ID input device side, whereby confirmation of the image can be performed in the image ID input device side.

The invention of the fifteenth aspect is an image processing apparatus, comprising: an image ID adding section which adds an image ID that identifies image data to the image data; an image processing section which determines a processing condition of predetermined image processing, performs the predetermined image processing on the image data and converts the image data to output image data; a memory section which stores the output image data in correspondence with the image ID; an image ID recording section which records the image ID onto a recording material on which an image is recorded by a recording section; an image ID input section for inputting the image ID recorded on the recording material on which the image, which is to be recorded again, is recorded; and a recording section which records the image onto the recording material on the basis of the output image data that is stored in the memory section in correspondence with the image ID inputted by the image ID input section.

In the invention of the fifteenth aspect, since the image ID adding section adds an image ID for distinguishing image data (for example, the image data obtained by reading an image recorded on a recording medium such as a photosensitive material, the image data obtained by reading an image from a recording medium such as a CD-ROM, or the like), even when image data of a large number of images exist, the image data of individual images can be distinguished on the basis of the image ID. The image processing section converts the image data to output image data by deciding a processing condition of a predetermined image processing and performing the predetermined image processing with regard to the image data. The memory section stores the output image data while making the output image data correspond to the image ID. The image ID recording section records the image ID corresponding to the image recorded on the recording material on which the image is recorded.

The image ID input section inputs the image ID recorded on the recording material on which the image is recorded by the image ID recording section, and the image is recorded on the recording material on the basis of the output image data corresponding to the image ID stored in the recording section by the recording section.

That is, the image stored in the memory section can easily be recorded on the recording material by inputting the image ID by the image ID input section. Therefore, at the time of reprinting, reprinting can be performed by inputting the image ID recorded on the recording material by the image ID input section, whereby reprinting can be performed efficiently.

The invention of the fifteenth aspect can have similar interactions and effects to those of the first aspect by further comprising a display section which displays an image on the basis of display image data for displaying an image, wherein the image processing section converts the image data to the display image data for displaying the image on the basis of the image data, the memory section stores the display image data in correspondence with the image ID, and the display section displays the image on the basis of the display image data which is stored in the memory section.

The invention of the seventeenth aspect, in the invention of the fifteenth aspect, is characterized in that the image data is the image data obtained by reading the image recorded on the recording medium.

By the invention of the seventeenth aspect, in the invention of the fifteenth aspect, the image data obtained by reading the image recorded on a recording medium, for example, the image recorded on a photosensitive material such as a photographic film or a photographic print or the like can be employed as the image data.

The invention of the eighteenth aspect is the image processing apparatus of the fifteenth aspect, wherein the image ID recording section is a printer which prints the image ID, and the image ID input section is a reader which inputs by reading the image ID that was printed.

The invention of the nineteenth aspect is the image processing apparatus of the fifteenth aspect, wherein the image ID recording section is a character string printer which prints a character string that represents the image ID, and the image ID input section is an input device for inputting the image ID on the basis of the character string that was printed.

The invention of the twentieth aspect is an image output device, comprising: an image ID input section which inputs an image ID that identifies image data; a communication section which acquires output image data by communication, the output image data being stored at an external section in correspondence with the inputted image ID; and a recording section which records an image on a recording material on the basis of the output image data acquired by the communication section.

By the invention of the twentieth aspect, the image ID input section inputs an image ID for distinguishing image data (for example, the image data obtained by reading an image recorded on a recording material such as a photosensitive material, the image data obtained by reading an image from a recording medium such as a CD-ROM, or the like), and the communication section acquires the output image data stored while being made correspond to the image ID from an outer part of the image output device. The recording section records the image on a recording material on the basis of the output image data acquired by means of the communication section. That is, since desired output image data can be acquired by the communication section on the basis of the image ID inputted by the image input section, even when image data of a large number of images exist, distinguishing the image data of individual images can be performed on the basis of the image ID inputted by the input section, and the image of the recording material can be recorded. Therefore, merely inputting the image ID in the image ID input section enables reprinting, and thus reprinting work can be performed efficiently.

A telephone line, the Internet, a radio communication, an optical communication, or the like can be employed as the communication section.

The twenty-first aspect is the image output device of the nineteenth aspect, further comprising an image display section which displays an image on the basis of the output image data acquired by the communication section.

The invention of the twenty-second aspect is the image output device of the twentieth aspect, wherein the image data is image data obtained by reading an image recorded on a recording medium.

The invention of the twenty-third aspect is an image processing system, including an image processing apparatus and the image output device of the twentieth aspect, the image processing apparatus comprising: an image ID adding section which adds an image ID that identifies image data to the image data; an image processing section which determines a processing condition of predetermined image processing, performs the predetermined image processing on the image data and converts the image data to output image data; and a memory section which stores the output image data in correspondence with the image ID.

The invention of the thirteenth aspect is constituted as an image processing system comprising an image processing apparatus having an image ID adding section, an image processing section, and a memory section and an image output device of the eleventh aspect. In the image processing apparatus, an image ID that identifies image data is added to the image data by the image ID adding section, the predetermined image processing is performed with regard to the image data and the image data are converted to output image data by the image processing section, and the image ID and the output image data are stored while being made correspond to each other by the memory section.

That is, since the predetermined image processing is provided by the image processing section and the output image data stored corresponding to the image ID in the memory section are acquired by the communication section correspondingly and are recorded on the recording material by the recording section on the basis of the image ID inputted by the image ID input section of the image output device, even when image data of a large number of images exist, an desired image can be acquired by the image ID, whereby this system can be utilized at the time of reprinting where the same image is recorded on a recording material over again. By performing reprinting like this, printing of the same image over again can be performed only by the input of the image ID without preparing again the photosensitive material on which the image is recorded, whereby reprinting work can be performed efficiently.

The invention of the twenty-fourth aspect is the image processing system of the twenty-third aspect, wherein the image processing apparatus further comprises: an image recording section which records an image onto the recording material on the basis of the output image data when the output image data is stored in the memory section; and an image ID recording section which records the image ID onto the recording material on which the image is recorded by the recording section.

By the invention of the twenty-fourth aspect, an image can be recorded on a recording material and can be outputted even in the image processing apparatus by providing the image recording section provided in the image output device in the image processing section. The image ID can be recorded on the recording material by providing the image ID recording section in the image processing apparatus. Therefore, when the same image is next outputted, the recording material on which the same image is recorded by the image output device can be obtained by inputting the image ID recorded on the recording material to the image ID input section of the image output device. Thus, reprinting work can be performed efficiently.

The invention of the twenty-fifth aspect is an image processing system, including an image processing apparatus and an image ID input device, the image processing apparatus comprising: an image ID adding section which adds an image ID that identifies image data to the image data; an image processing section which determines a processing condition of predetermined image processing, performs the predetermined image processing on the image data and converts the image data to output image data; a memory section which stores the output image data in correspondence with the image ID; a communication section which acquires the image ID from an external portion; and a recording section which records an image onto a recording material on the basis of the output image data that is stored in the memory section in correspondence with the acquired image ID, and the image ID input device comprising: an image ID input section which inputs the image ID; and a transmission section which transmits the image ID to the image processing apparatus.

The invention of the twenty-fifth aspect is constituted as an image processing system comprising an image processing apparatus having an image ID adding section, an image processing section, a communication section, and a recording section and an image ID input device having an image ID input section and a transmission section. In the image processing apparatus, an image ID for distinguishing an image is added to the image data by the image ID adding section, the predetermined image processing is performed with regard to the image data and the image data are converted to output image data by the image processing section, and the image ID and the output image data are stored while being made correspond to each other by the memory section. In the communication section, an image is recorded on a recording material on the basis of the output image data stored in the memory section while being made correspond to the image ID.

In the image ID input device, the image ID is inputted by the image ID input section, and the image ID of the input is transmitted by means of the transmission section. A telephone line, the Internet, a radio communication, an optical communication, or the like can be employed as the communication section and the transmission section.

That is, although the image processing apparatus and the image ID input device are disposed on different places, an image can be recorded by the recording section of the image processing apparatus on the basis of the image ID acquired by the communication section by inputting the image ID to the image ID input section of the image ID input device.

Accordingly, at the time of reprinting, a reprint can be obtained by means of the recording section of the image processing apparatus by inputting the image ID to the image ID input section of the image ID input device, whereby reprinting work can be performed efficiently.

The invention of the twenty-sixth aspect is the image processing system of the twenty-fifth aspect, wherein the image processing apparatus further comprises an image ID recording section which records the image ID onto the recording material on which the image is recorded.

By the invention of the twenty-sixth aspect, in the invention of the twenty-fifth aspect, by further providing the image ID recording section recording the image ID on the recording material, at the time of performing reprinting where image recording is performed again, the image can be recorded in the image processing apparatus by inputting the image ID recorded on the recording material to the image ID input device. That is, reprinting work can be performed efficiently.

In the case in which the image processing apparatus and the image ID input device are disposed on different places, the recording material on which the image is reprinted is outputted in the image processing apparatus side by inputting the image ID recorded on the recording material in the image ID input device.

A twenty-seventh aspect of the present invention is the image processing system of the twenty-sixth aspect, wherein the image ID input section inputs the image ID that was recorded by the image ID recording section onto the recording material on which the image was recorded.

In accordance with the invention of the twenty-seventh aspect, in the invention of the twenty-sixth aspect, the image ID input section inputs the image ID that was recorded by the image ID recording section onto the recording material onto which the image was recorded. If the image is to be recorded onto recording material again by reprinting and the like, the image ID is transmitted to the image processing apparatus via the transmission section of the image ID input device and the communication section of the image processing apparatus. Thus, a reprint of the image which corresponds to the image ID can be provided by the recording section of the image processing apparatus.

The invention of the twenty-eighth aspect is the image processing system of the twenty-fifth aspect, wherein the image data is image data obtained by reading an image recorded on a recording medium.

By the invention of the twenty-second aspect or the twenty-eighth aspect, in the invention of the twentieth aspect or the twenty-fifth aspect, the image data obtained by reading the image recorded on a recording medium, for example, the image recorded on a photosensitive material such as a photographic film or a photographic print or the like can be employed as the image data.

The invention of the twenty-ninth aspect is the image processing system of the twenty-fourth aspect, wherein the image ID recording section is a printer which prints the image ID, and the image ID input section is a reader which inputs by reading the image ID that was printed.

The invention of the thirtieth aspect is the image processing system of the twenty-sixth aspect, wherein the image ID recording section is a printer which prints the image ID, and the image ID input section is a reader which inputs by reading the image ID that was printed.

By the invention of the twenty-ninth aspect, the thirtieth aspect, or the eighteenth aspect in the invention of the twenty-fourth aspect, the twenty-fifth aspect, or the fifteenth aspect, the image ID recording section contains a printer printing the image ID and prints the image ID added by the image ID adding section for example on the reverse face of the recording material, and the image ID can be inputted by reading the image ID printed by means of a reading device.

For example, the image ID can be added to the recording material by printing a bar code on the reverse face of the recording material or the like by the printer printing a bar code, and the image ID recorded on the recording material can be inputted by reading the bar code printed by the bar code reader.

The invention of the thirty-first aspect is the image processing system of the twenty-second aspect, wherein the image ID recording section is a character string printer which prints a character string that represents the image ID, and the image ID input section is an input device for inputting the image ID on the basis of the character string that was printed.

The invention of the thirty-second aspect is the image processing system of the twenty-sixth aspect, wherein the image ID recording section is a character string printer which prints a character string that represents the image ID, and the image ID input section is an input device for inputting the image ID on the basis of the character string that was printed.

By the invention of the thirty-first aspect, the thirty-second aspect, or the nineteenth aspect, in the invention of the twenty-fourth aspect, the twenty-sixth aspect, or the fifteenth aspect, the image ID can be inputted by printing a character string representing the image ID added by the image ID adding section by the character string printer printing the character string for example on the reverse face of the recording material or the like and by performing inputting via the input device (for example, a key board) on the basis of the character string printed.

In the present invention, it is possible to employ, for example, a bar code, image characteristic data representing the characteristics of an individual image (for example, compressed image data, density histogram data, or the like) electronic chain mark, or the like as the image ID for distinguishing an image.

DETAILED DESCRIPTION OF THE PREFERRED EMBODIMENT

First Embodiment

Below, the first embodiment according to the present invention will be explained in detail referring to drawings.

Figure 1:
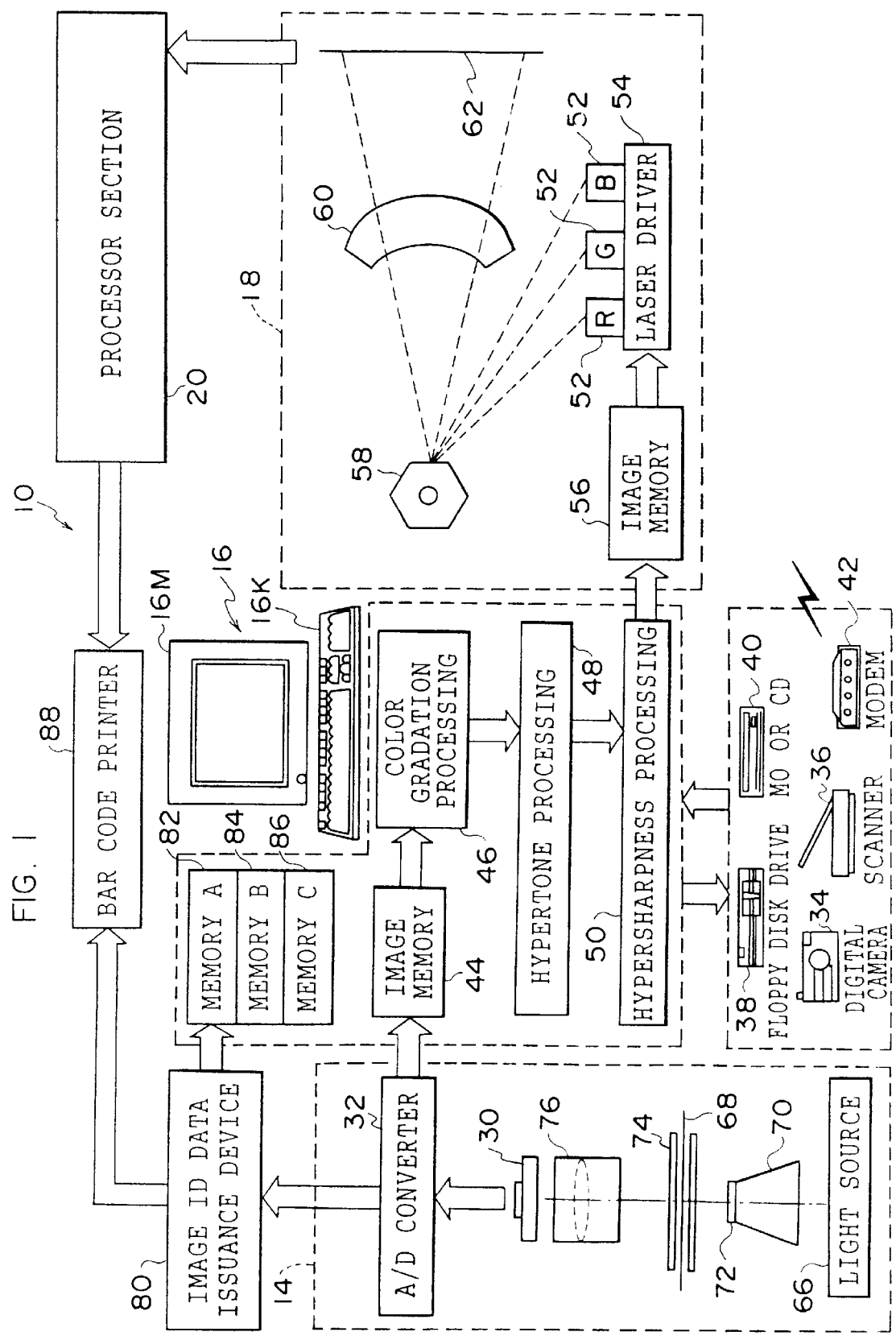
FIG. 1 is a diagram showing an outlined constitution of a digital laboratory system according to the first embodiment of the present invention.
Figure 2:
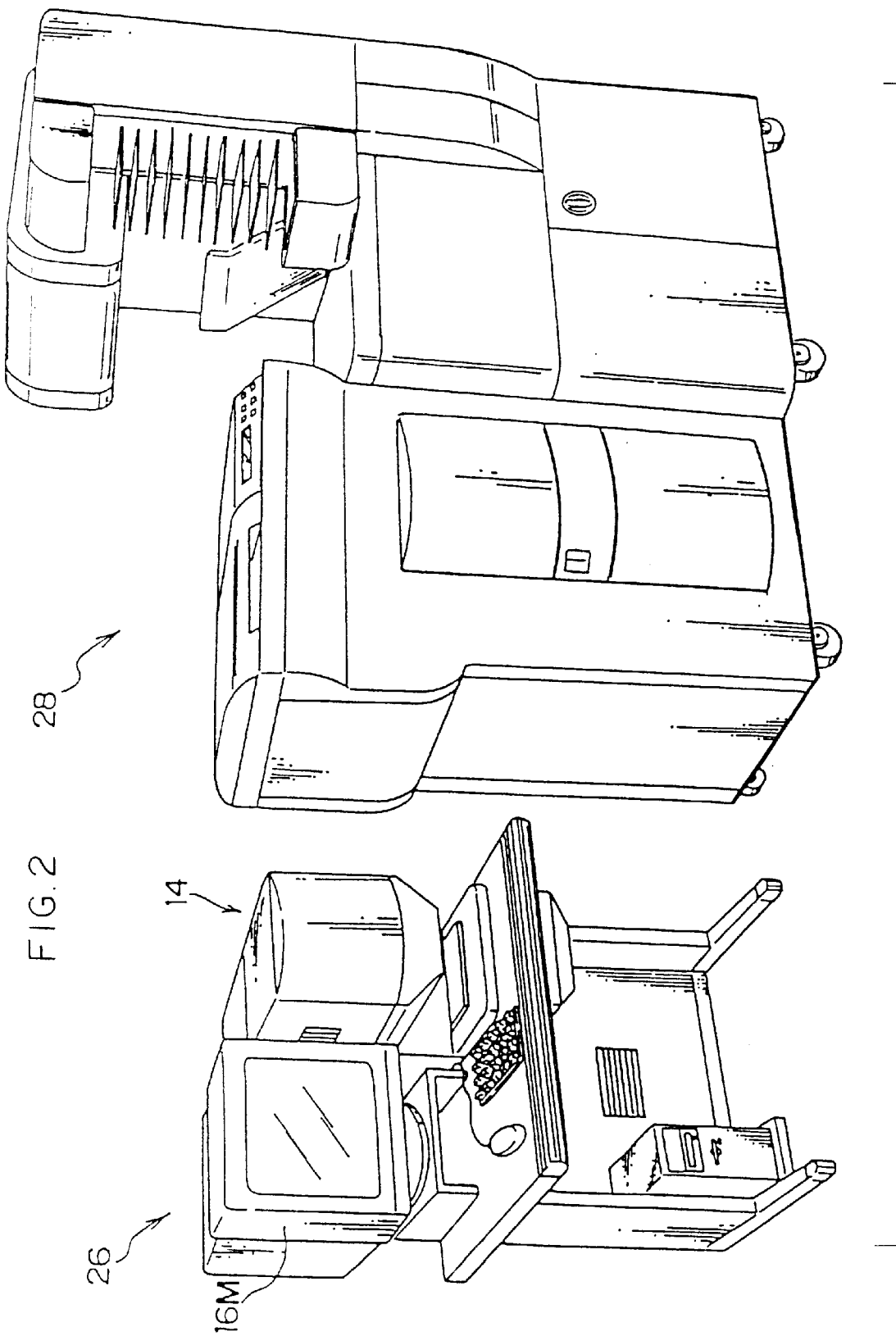
FIG. 2 is a sketch drawing of a digital laboratory system according to an embodiment of the present invention.

FIG. 1 and FIG. 2 show outlined constitutions of a digital laboratory system 10 according to the first embodiment of the present invention.

As shown in FIG. 1, the digital laboratory system 10 is constituted, containing a line CCD scanner 14, an image processing section 16, a laser printer part 18, and a processor section 20. The line CCD scanner 14 and the image processing section 16 are integrally formed as an input part 26 shown in FIG. 2, and the laser printer part 18 and the processor section 20 are integrally formed as an output part 28 shown in FIG. 2.

The line CCD scanner 14 is provided with a light source 66 irradiating light to a photographic film 68. An acrylic block 70 and a light diffusion board 72 are arranged in order in the light radiation side of the light source 66 as light leading members by which the light irradiated to the photographic film 68 is made diffused light.

The photographic film 68 is conveyed so that the image plane of a frame image is vertically placed to an optical axis by a film carrier 74 arranged in a light radiation side (the side in which the light diffusion board 72 is provided) of the acrylic block 70. A lens unit 76 and a line CCD 30 image-forming the light permeating the frame image along the optical axis are arranged in order in the opposite side to the light source 66, interposing the photographic film 68.

The line CCD scanner 14 is for reading the frame image recorded on the photographic film such as a negative film or a reversal film. For example, an object of reading may be a frame image of a photographic film of a 135 size, a photographic film of a 110 size, a photographic film in which a transparent magnetic layer is formed (a photographic film of a 240 size: so called APS film), and a photographic film of a 120 size and a 220 size (Brownie size). The frame image of the reading object mentioned above is read at the line CCD 30 in the line CCD scanner 14 and is A/D converted at an A/D converter 32, and then the image data are output to the image processing section 16 and are output to the an image ID data issuance device 80.

The image ID data issuance device 80 adds an image ID for distinguishing a frame image to frame image data of each frame image recorded on the photographic film read out by the line CCD scanner 14 and outputs the image ID to a memory A82 of the image processing section 16 and a bar code printer 88.

The image processing section 16 is constituted so that the image data output from the line CCD scanner 14 (scan image data) are inputted thereto, and image data obtained by photographing at a digital camera 34 or the like, image data obtained by reading out a copy (for example, a reflection copy or the like) by a scanner 36 (a flat bed type), image data formed in another computer, and communication image data received via a modem 42, or the like (hereafter, all data like these will be referred to file image data) can also be inputted from an outer part.

The image processing section 16 stores the image data inputted in an image memory 44 and determines processing conditions of image processing such as every kind of corrections in a color gradation process 46, a hypertone process 48, and a hypersharpness process 50. Then, the image processing section 16 performs image processing in accordance with the processing conditions of the determined image processing so as to convert the image data to recording image data and outputs them to the laser printer part 18. Further, the image processing section 16 can output the image data image processed to an outer part as an image file (for example, can output to a recording medium such as a FD, a MO, or a CD-R, or transmit to another information processing device via a communication line, or the like). Moreover, the image processing section 16 converts the image data to display image data for displaying on a monitor 16M according to the processing conditions of the determined every kind of image processing. By the display image data, a simulation image in which the image obtained when the image is recorded on a sheet of photographic paper simulated by using the recording image data is simulated is displayed on the monitor 16M. The finishing of the image is verified on the basis of the simulated image.

The image processing section 16 has the memory A82, a memory B84, and a memory C86. The image data to which the image ID issued in the image ID data issuance device 80 as described above is added are stored in the memory A82. The display image data for being displayed on the monitor 16M are stored in the memory B84 corresponding to the image ID. The recording image data are stored in the memory C86 corresponding to the image ID.

The laser printer part 18 has laser light sources 52 of R, G, and B and controls a laser driver 54 so that the laser light modulated according to the recording image data (once stored in the image memory 56) inputted from the image processing section 16 is irradiated on a sheet of photographic paper 62 so as to record an image on the photographic paper 62 so as to record an image on the photographic paper 62 by scanning exposure (in the present embodiment, an optical system mainly employing a polygon mirror 58 and a fθ lens 60). The processor section 20 provides each process of color development, bleaching fixing, water rinsing, and drying for the photographic paper 62 on which an image is recorded by scanning exposure in the laser printer part 18. By this a print in which the image is formed on the photographic paper 62 is output to the bar code printer 88.

The bar code printer 88 is constituted so as to print the image ID corresponding to the image formed on the print added by the image ID data issuance device 80 on the reverse face of the print as a bar code.

Figure 3:
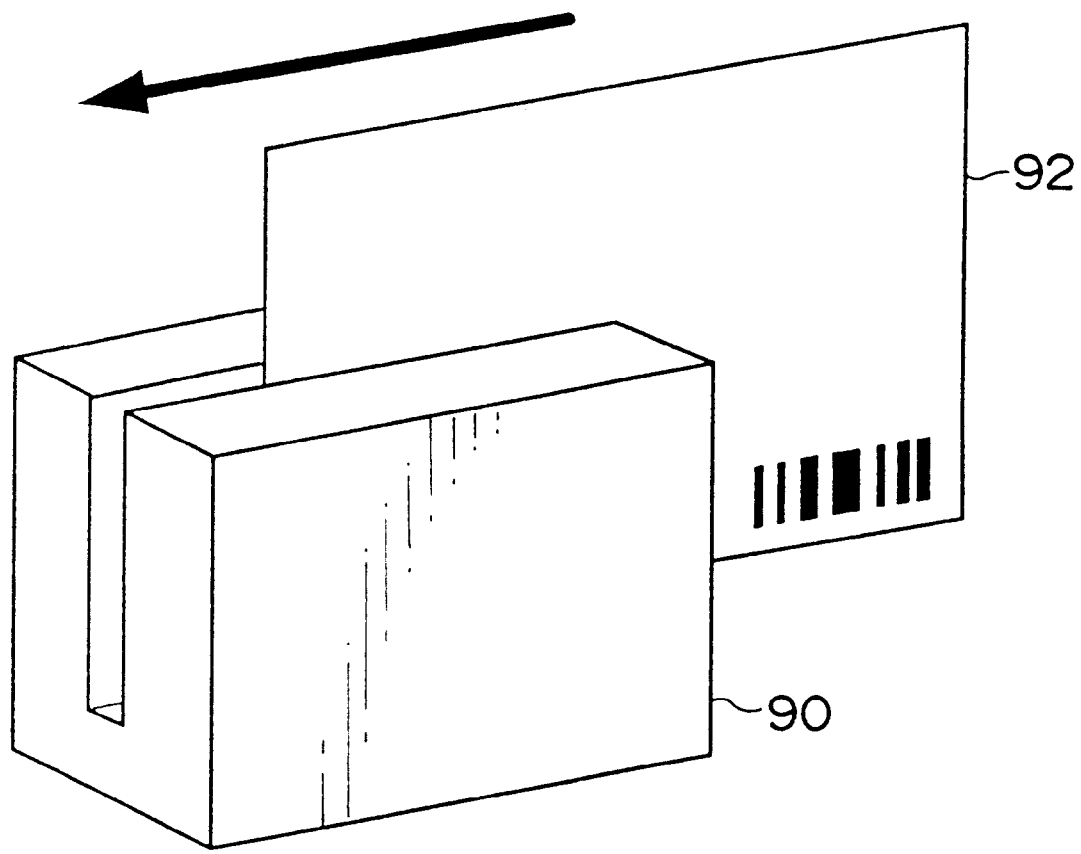
FIG. 3 is a sketch drawing of a bar code reader.

In the digital laboratory system 10 according to the present embodiment, a bar code reader 90 as shown in FIG. 3 is connected to the image processing section 16 so as to read the bar code printed in the bar code printer 88. The bar code reader 90 is formed so that its cross section is approximately U shaped, reads the bar code printed on the reverse face of a print 92 by the movement of the print in which the print 92 passes through an approximately U shaped recess, and outputs the image ID read to the image processing section 16. The display image data and the recording image data stored in the memory A82, the memory B84, and the memory C86 are read through the image ID read by the bar code reader 90. When printing is performed over again (hereafter, referred to reprinting), the display image data and the recording image data on the processing conditions of the image processing of the time of making a first print are read by reading the bar code printed on the reverse face of the print by the bar code reader 90 so that a correction is made on the basis of the data read. Accordingly, the image same as that of the time of making a first print can be displayed on the monitor 16M at the time of reprinting. Further, since the correction is made with regard to the processing conditions of the image processing of the time of making the first print while seeing the print 92 and the image displayed on the monitor 16M so that image processing can be performed according to the corrected processing conditions, there may be no case in which a correction amount of an operator with regard to the first print becomes inappropriate by the difference in processing conditions of image processing as happened in the prior art. Moreover, since a photographic film is unnecessary at the time of reprinting, the necessity of reading again a frame image of an object of reprinting may be eliminated, and thus the time for reprinting work can be shortened, and the workload can be reduced. Furthermore, since the image ID is read by the bar code at the time of reprinting, trouble such as inputting of the frame number of the object of reprinting can also be eliminated.

Figure 4:
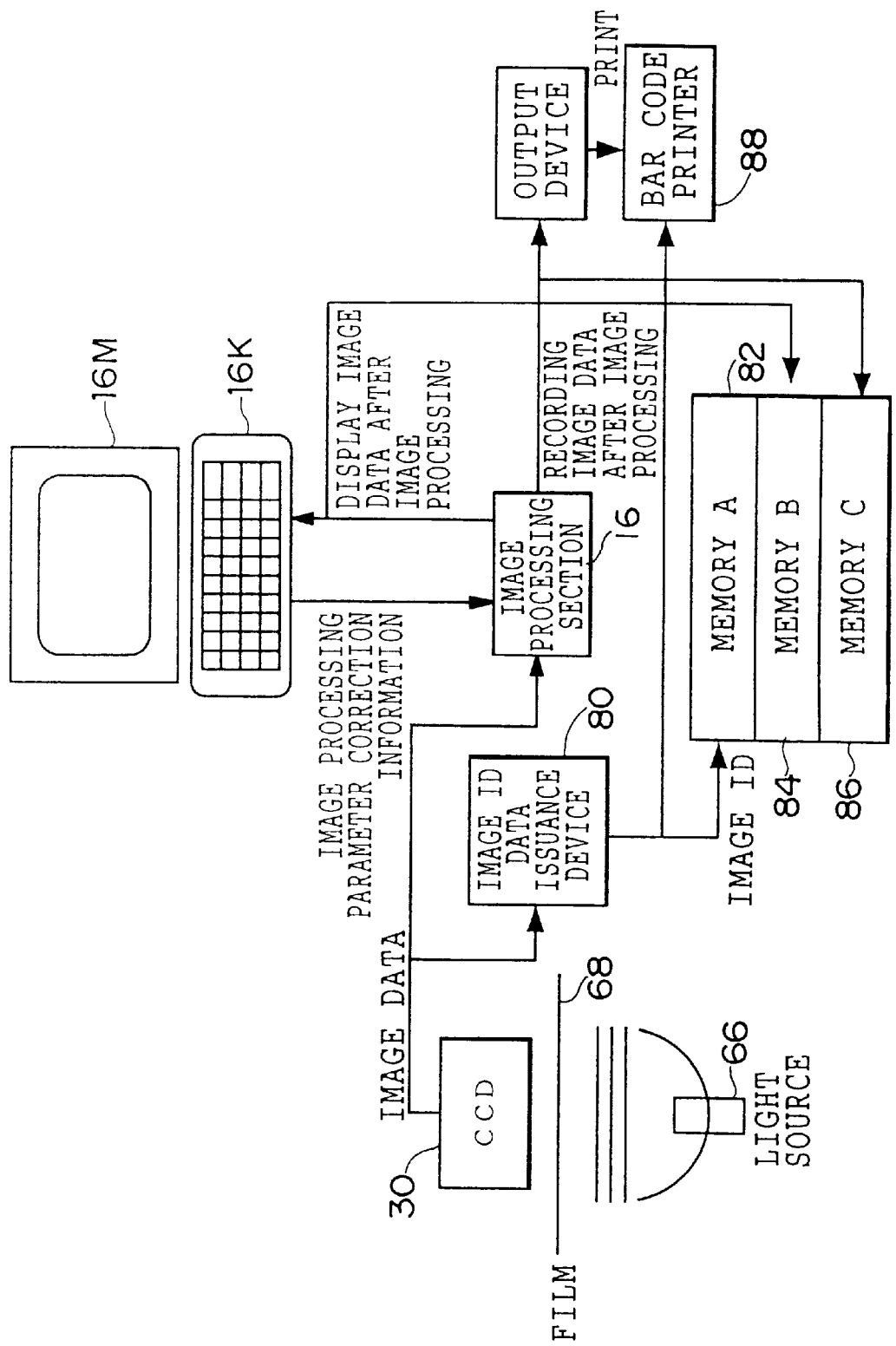
FIG. 4 is a diagram for explaining processes of the time of making a first print of a digital laboratory system according to the first embodiment of the present invention.
Figure 5:
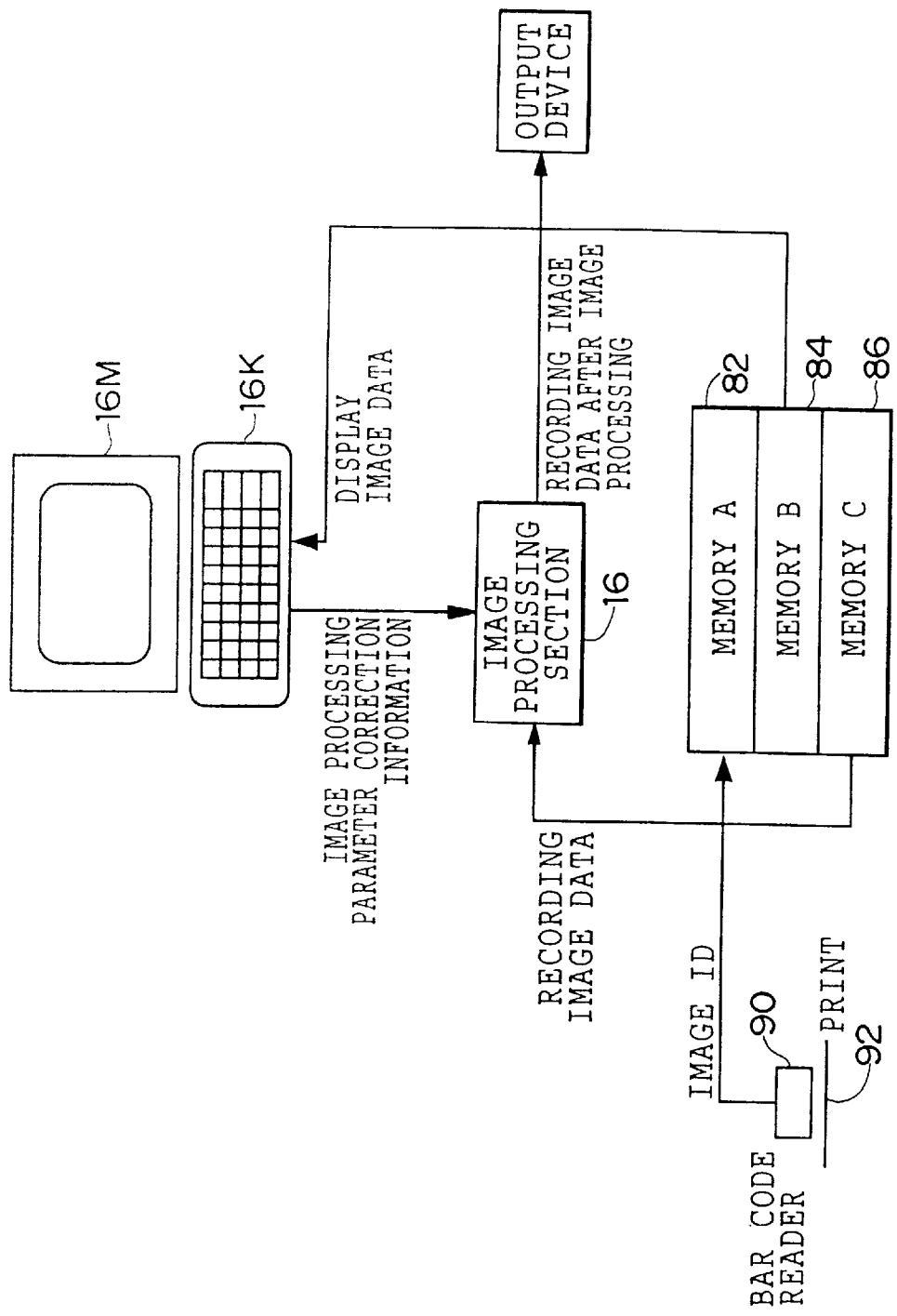
FIG. 5 is a diagram for explaining processes of the time of reprinting of a digital laboratory system according to the first embodiment of the present invention.

Interactions of the present embodiment will be explained with regard to the times of making a first print and of reprinting, respectively, referring to drawings. FIG. 4 is a block diagram showing processes of the time of making a first print, and FIG. 5 is a block diagram showing processes of the time of reprinting.

At the time of making a first print, an operator inserts the photographic film 68 into the film carrier 74 and instructs a frame image reading start by means of a key board 16K of the image processing section 16 so that the photographic film 22 is conveyed in the film carrier 74. By this conveyance, a prescan is performed. That is, not only an image frame but also every kind of information recorded outside an image recording area of the photographic film 68 are read by means of the line CCD scanner 14 while the photographic film 68 is conveyed at a relatively high speed.

Next, reading conditions of the time of fine scan are set for each frame image on the basis of the result of the prescan for each frame image so that the reading conditions of the time of fine scan are set for each frame image on the basis of the result of the prescan.

The image data read by the prescan are converted to the display image data for displaying on the monitor 16M and are output to the monitor 16M so that the simulated image in which the image obtained when the image is recorded on the photographic paper using the display image data is simulated is displayed on the monitor 16. The operator verifies the finishing of the image on the basis of the simulated image displayed on the monitor 16M.

After the completion of the setting of the reading conditions for the time of fine scan for entire frame images, the photographic film 68 is conveyed in the opposite direction to that of the prescan so as to perform the fine scan for each frame image.

At this time since the photographic film 68 is conveyed in the opposite direction to that of the time of prescan, the fine scan is performed from the final frame to the first frame in order. The fine scan is set so that the conveyance speed is slower than that of the prescan, by this difference amount the resolution at the time of reading becomes high. At the time of prescan since image conditions (for example, a photographed image aspect ratio, a photographing condition such as under, normal over, and super over, or the like, whether or not a stroboscope photography is executed, and the like) are recognized, reading can be performed on appropriate reading conditions.

The image data read by the line CCD scanner 14 are output to the image memory 44 of the image processing section 16 as well as to the image ID data issuance device 80. The image data output to the image memory 44 of the image processing section 16 are once stored in the image memory 44, then are provided with every kind of image processing by the color gradation process 46, the hypertone process 48, and the hypersharpness process 50, and are output to the laser printer part 18 as the recording image data.

The display image data of the time after the image processing in which verification is performed are output to and stored in the memory B84, and the recording image data are output to and stored in the memory C86.

The image data read by the line CCD scanner 14 and output to the image ID data issuance device 80 are added the image ID by the image ID data issuance device 80 for distinguishing the image and are output to and stored in the memory A82.

The recording image data provided with every kind of image processing in the image processing section 16 are output to the laser printer part 18, the laser light modulated according to the recording image data by the laser printer part 18 is irradiated on the photographic paper 62, and the image is recorded on the photographic paper 62 by the scanning exposure so that the photographic paper is output to the processor section 20. The processor section 20 provides each process of color development, bleaching fixing, water rinsing, and drying for the photographic paper 62 on which an image is recorded by the scanning exposure in the laser printer part 18. By this an image is formed on the photographic paper 62. The photographic paper 62 on which the image is formed is output to the bar code printer 88 as the print 92, and the bar code representing the image ID added in the image ID data issuance device 80 is printed on the reverse face of the print 92. In FIGS. 4 and 5, the laser printer part 18 and the processor section 20 are shown as an output device.

Next, processes of the time of reprinting relative to the first print formed as described above will be explained.

The finishing of all first prints made are verified by the operator. The first print judged as not appropriate in finishing is extracted for reprinting. The operator moves the print 92 made at the time of making first print so that the print 92 (the print to be provided with reprinting) passes through the approximately U shaped recess of the bar code reader 90 shown in FIG. 3. By this the bar code printed on the reverse face of the print 92 is read as shown in FIG. 5, and the image ID of the print 92 can be obtained through the bar code read. The image ID is collated with the image ID data stored in the memory A, the display image data corresponding to the image ID are read out from the memory A82 and are output to the monitor 16M, and the recording image data corresponding to the image ID are read out from the memory C86. That is, corresponding image data can be easily read out only by reading the bar code.

The operator corrects processing conditions of image processing by inputting parameter correction information of image processing in the key board 16K of the image processing section 16 while seeing the display image displayed on the monitor 16M and the print 92 of the time of making the first print. With respect to inputting correction information to the key board 16K, correction for the processing conditions of the image processing of the first print is performed by operating the key corresponding to the density key or the CMY key of the key board 16K while seeing the display image and the first print. For example, judgement is made in such a manner that the density key is added one more, or one CMY key is deducted, while seeing the display image and the first print, and performed is a key input corresponding to a manner that one density key is added, or one CMY key is deducted, or the like, in the key board 16K. The image corrected in the density and/or color according to the key input is redisplayed on the monitor 16M, and when the operator inputs a correction "OK" of the processing conditions of the image processing, the correction of the recording image data is performed on the basis of the parameter correction information decided by this "OK" input.

When the parameter correction information is inputted and the correction of the recording image data is performed as described above, the reprinting is performed by the output device including the laser printer part 18 and the processor section 20 and the reprinting is completed.

The display image data and the recording image data may be stored again in the memory B84 and the memory C86, respectively, at the time of reprinting. With respect to the data stored in the memory A82, the memory B84, and the memory C86, the former data may be erased at the time of completion of the reprinting, or desired data may be erased by an operational input of the operator to the key board 16K.

Since the display image data and the recording image data of the time of making the first print are stored, the same image as that of the time of making the first print can be displayed on the monitor 16M at the time of reprinting, and correction can be performed regarding the processing conditions of the image processing of the time of making the first print. Therefore, there may be no case in which a correction amount of the operator for the first print becomes inappropriate by the difference in processing conditions of image processing as in the prior art. Further, since there is no need of reading the photographic film again at the time of reprinting, work effectiveness can be improved and working hours can be shortened.

Although the reprinting of the image data obtained by reading the image recorded on the photographic film 68 by the line CCD scanner 14 is exemplified and explained in the above, embodiments may not be limited in this, and similar effects can be obtained regarding for example the image data obtained by the digital camera 34 or video photographing, the image data read from recording mediums such as a CD-ROM, or the like.

Next, a photographic print distribution system as an image processing system employing a digital laboratory system 10 according to the first embodiment will be explained. Detailed explanation of the digital laboratory system 10 will be omitted since it is the same as that in the first embodiment described above. Detailed explanation of other constitutions same as those of the first embodiment will also be omitted using the same numerals.

Basically, a photographic print distribution system 100 is constituted in such a manner that an image ID input device such as the bar code reader 90 of the digital laboratory system 10 according to the first embodiment or the key board 16K capable of inputting an image ID is arranged as an accepting device in an outer part.

Figure 9:
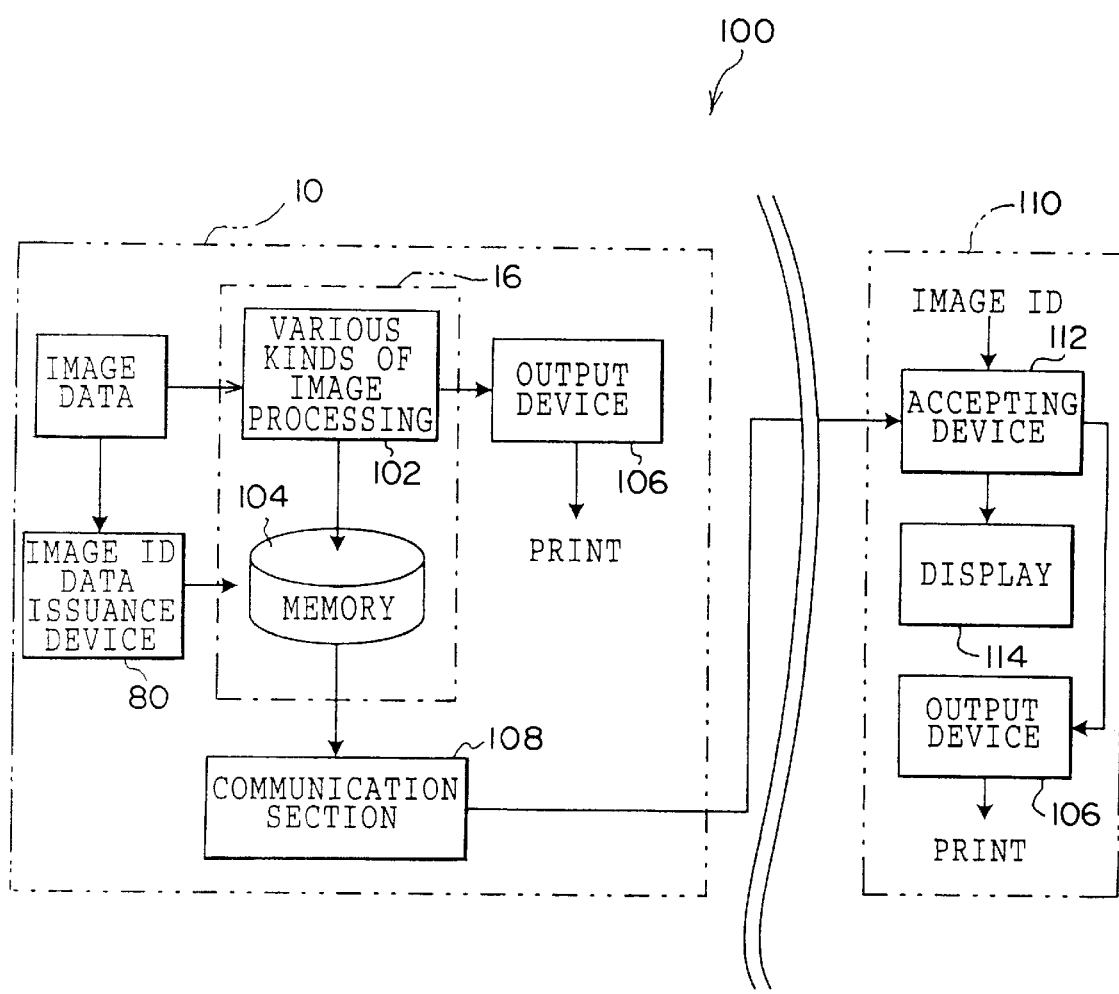
FIG. 9 is a diagram showing one example of a photographic print distribution system according to an embodiment of the invention.

FIG. 9 shows a chart diagram for explaining the outline of the photographic print distribution system 100. In FIG. 9, image processing such as the color gradation process 46, the hypertone process 48, and the hypersharpness process 50 is shown as various kinds of image processing 102, the memories 82, 84, 86 are shown as one memory 104, and the laser printer part 18 and the processor section 20 are shown as an output device 106.

As shown in FIG. 9, the digital laboratory system 10 is connected to a store 110 such as a convenience store where printing of images recorded on a negative film or the like are ordered via a communication means 108 such as the modem 42 described above. A telephone line, the Internet, a radio communication, an optical communication, or the like can be employed as the communication means 108.

At the store 110, an accepting device 112, capable of being inputted an image ID, such as for example the bar code reader 90 described above, is disposed and is constituted so as to transmit the inputted image ID to the digital laboratory system 10 and be capable of receiving image data corresponding to the image ID.

The image data received are displayed on a display 114 constituted so as to enable confirmation of images, and the output device 106 (the laser printer part 18 and the processor section 20 described above) is disposed so that a print on which an image is recorded can be outputted.

Next, interactions of the photographic print distribution system will be explained.

At the time of making a first print, since the first print is performed in the digital laboratory system 10 as described in the first embodiment, the explanation will be omitted.

At the time of reprinting, the print 92 is brought to the store 110 at the time of making the first print, and an image ID such as a bar code recorded on the reverse face of the print 92 for which reprinting is performed is inputted in the accepting device 112. In the present embodiment, input of the image ID to the accepting device 112 is performed by letting the print 92 for which reprinting is performed pass through the bar code reader 90.

In the accepting device 112, the image ID inputted by the bar code reader 90 is transmitted to the communication means 108 of the digital laboratory system 10. In the digital laboratory system 10, retrieval of the display image data and the recording image data recorded in the memory 104 and corresponding to the image ID is performed, corresponding display image data and recording image data are transmitted to the accepting device 112 of the store 110, and an image is displayed on the display 114 on the basis of the display image data transmitted. That is, whether or not the image is the one corresponding to the image ID can be confirmed by the display 114. The image confirmed can be outputted at the output device 106 of the store 119 side as the print 92 on the basis of the recording image data transmitted.

That is, only by bringing a first print to the store 110 and inputting an image ID to the accepting device 112, a reprint can be received at the store 110, whereby reprinting can be performed efficiently.

Figure 10:
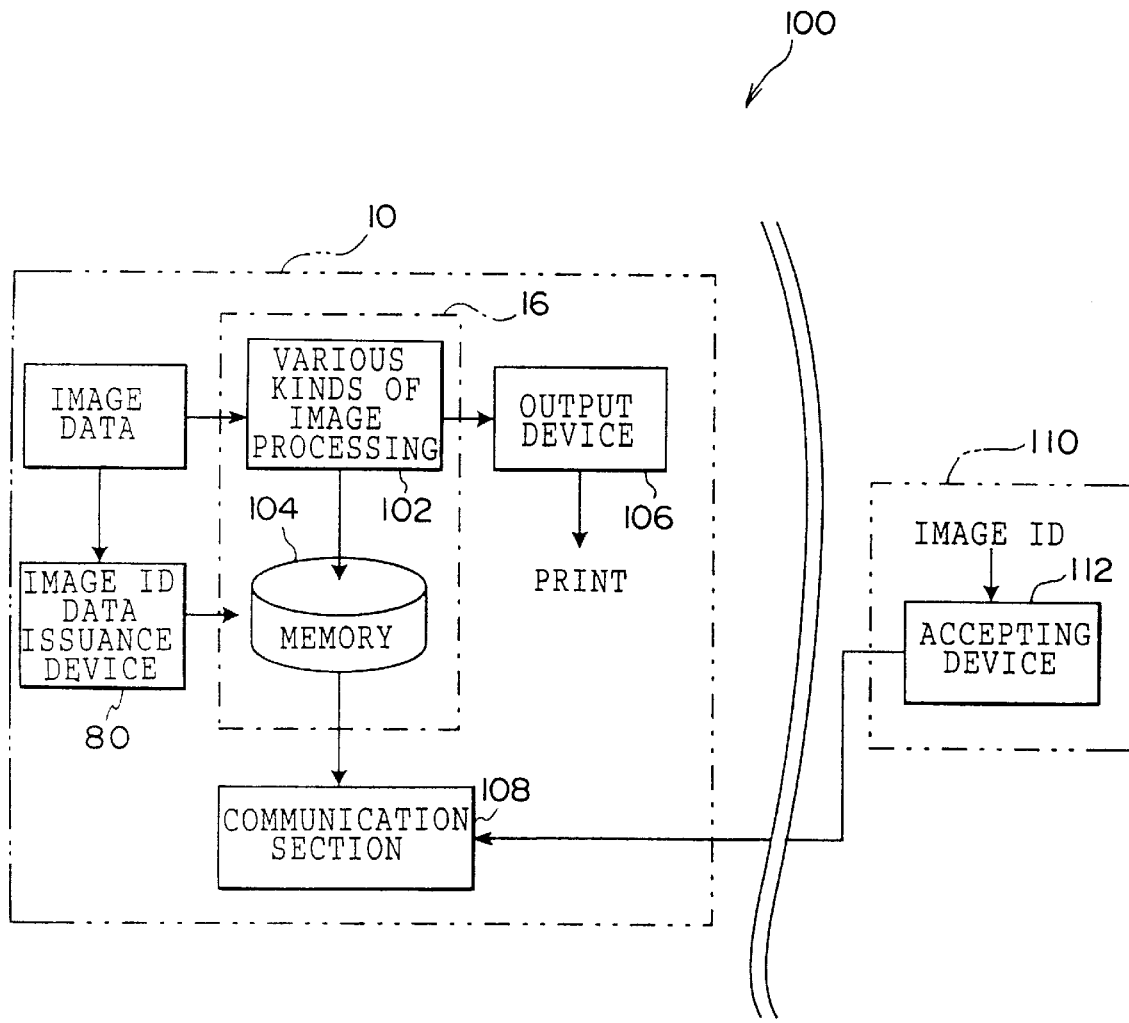
FIG. 10 is a diagram showing another example of a photographic print distribution system.

The photographic print distribution system 100 may be constituted as shown in FIG. 10. Since the photographic print distribution system shown in FIG. 10 is constituted so that only the accepting device 112 of the photographic print distribution system 100 is disposed at the store 110 described above, the output of reprinting is performed in the digital laboratory system 10, and the reprint is delivered on a later day or the like. If a reprint is required in this case, the image ID, which is the barcode recorded on the back of the first printing print 92 or the like, is inputted to the reception device 112. (In the present embodiment, input of the image ID is performed by passing the print 92 through the barcode reader 90.) Thus, the digital lab system 10 can carry out reprinting and provide the reprint.

By this way, the apparatus cost of the store 110 side can be reduced, thereby making infrastructure maintenance easy.

The accepting device 110 is not necessary to be disposed at the store 110. For example, by employing image characteristic data representing the characteristics of an image (compressed image data, density histogram data, or the like) or the like as an image ID, a reprint can be ordered via a communication means such as the Internet while utilizing a private personal computer or the like.

Second Embodiment

Next, the second embodiment of the present invention will be explained in detail.

Figure 6:
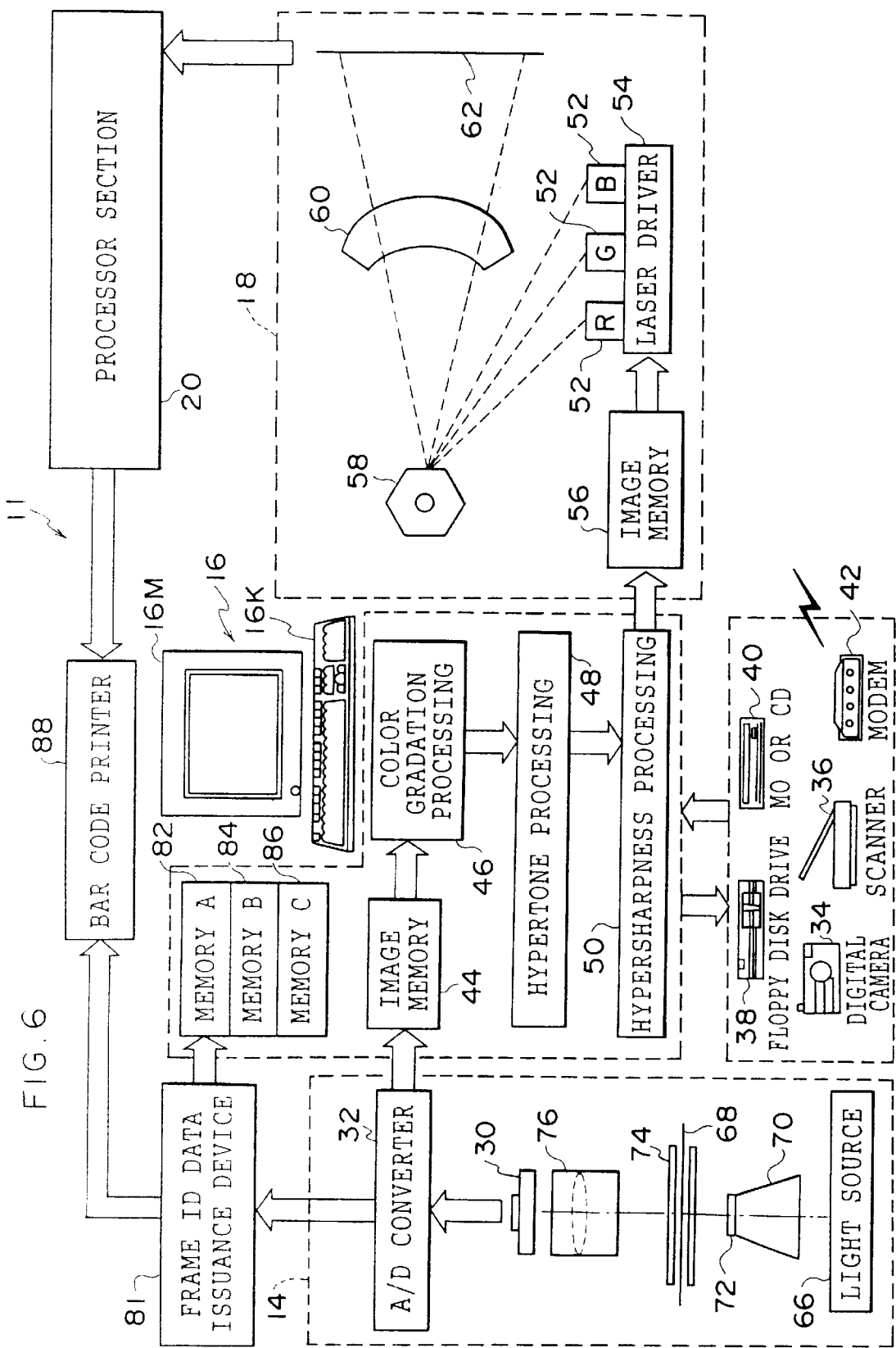
FIG. 6 is a diagram showing an outlined constitution of a digital laboratory system according to the second embodiment of the present invention.

FIG. 6 shows an outlined constitution of a digital laboratory system 11 according to the sec on d embodiment of the present invention.

The digital laboratory system 11 according to the second embodiment of t he present invention is constituted so as to be provided with a frame ID data issuance device 81 adding a frame ID for distinguishing a frame image on a photographic film from a frame image of a photographic film as a substitute for the image ID data issuance device 80 in the digital laboratory system 10 according to the first embodiment. The image data to which the frame ID issued in the frame ID data issuance device 81 is added are stored in the memory A82, and the display image data for displaying on the monitor 16M and verifying the finishing of an image are stored in the memory B84 corresponding to the frame ID as similar to the first embodiment. Image processing condition parameters as processing conditions of image processing of the time when image processing is performed at the time of making a first print so as to convert the image data to the recording image data are stored in the memory C86 corresponding to the frame ID. The digital laboratory system 11 is constituted so that the image of a reprinting object recorded on the photographic film is read again at the time of reprinting. The explanation for other constitutions are omitted since it is similar to that of the first embodiment.

Figure 7:
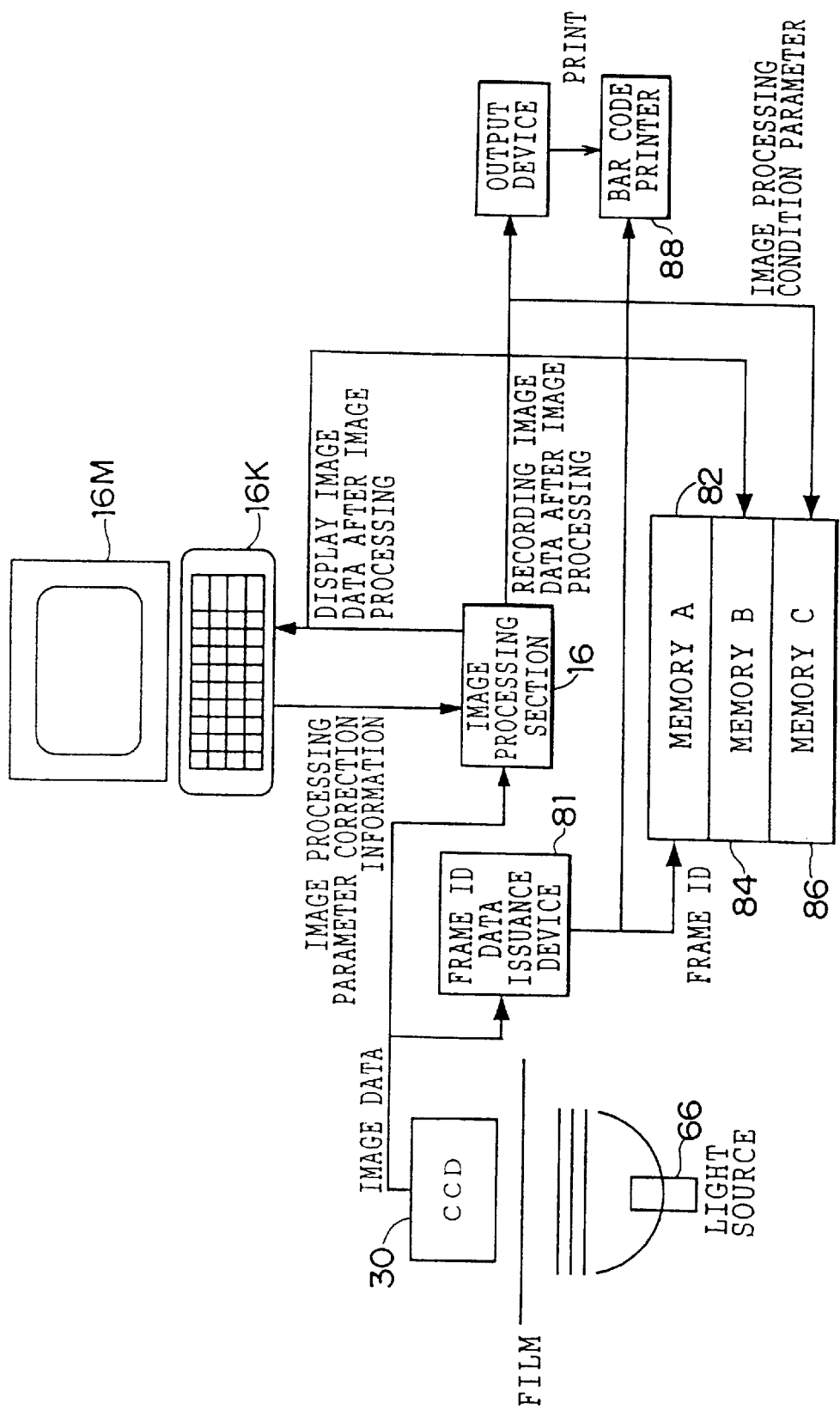
FIG. 7 is a diagram for explaining the processes of the time of making a first print of a digital laboratory system according to the second embodiment of the present invention.
Figure 8:
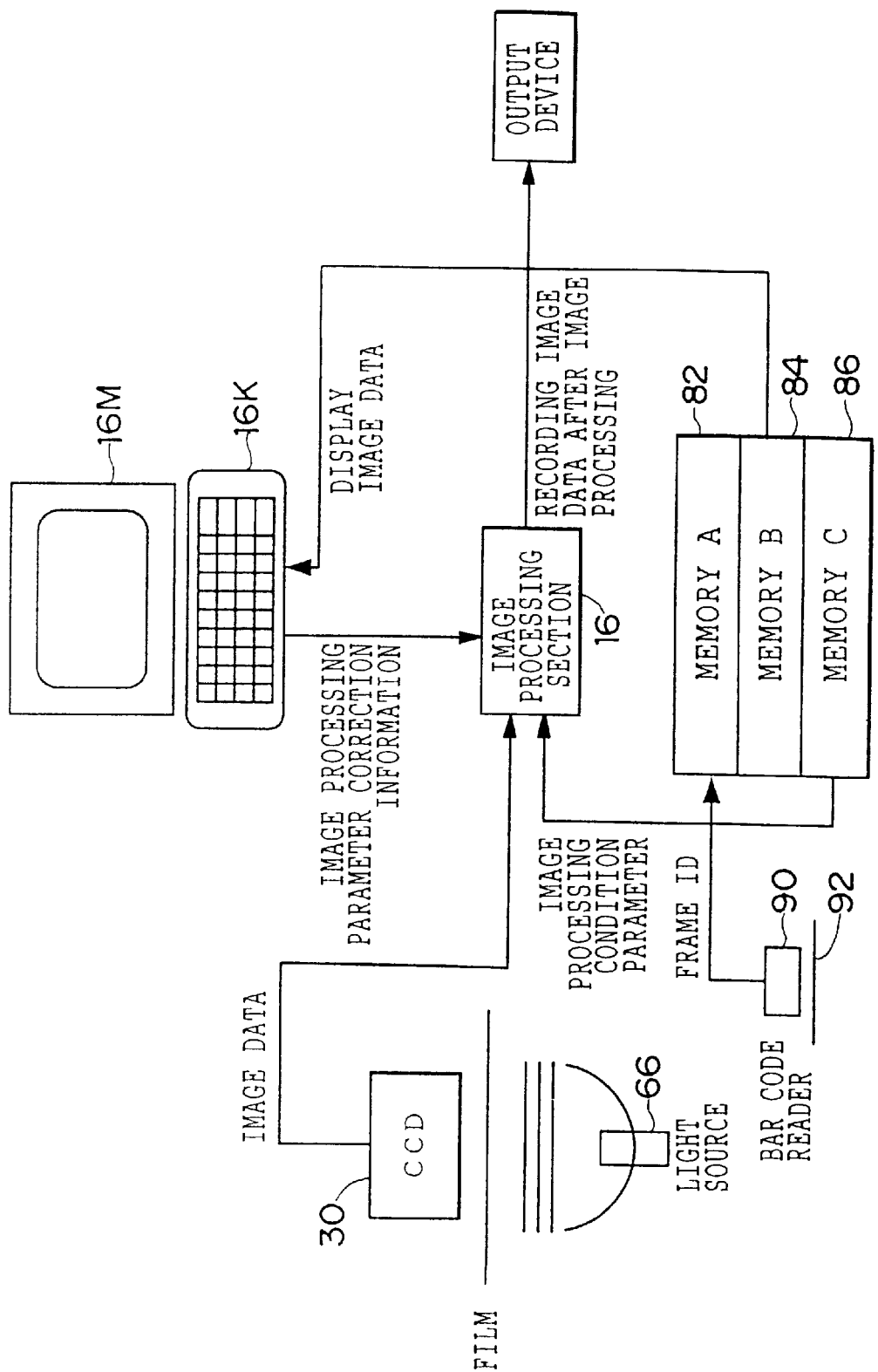
FIG. 8 is a diagram for explaining the processes of the time of reprinting of a digital laboratory system according to the second embodiment of the present invention.

Interactions of the present embodiment will be explained for the times of making a first print and of reprinting, respectively, referring to drawings, as similar to the first embodiment. FIG. 7 is a block diagram showing processes of the time of making a first print, and FIG. 8 is a block diagram showing processes of the time of reprinting.

At the time of making a first print, an operator inserts the photographic film 68 into the film carrier 74 as similar to the first embodiment and instructs a frame image reading start by means of the key board 16K of the image processing section 16 so that the photographic film 22 is conveyed in the film carrier 74. By this conveyance, the prescan is performed. That is, not only an image frame but also every kind of information recorded outside an image recording area of the photographic film 68 are read by means of the line CCD scanner 14 while the photographic film 68 is conveyed at a relatively high speed.

Next, reading conditions of the time of fine scan are set for each frame image on the basis of the result of the prescan for each frame image so that the reading conditions of the time of fine scan are set for each frame image on the basis of the result of the prescan.

The image data read by the prescan are converted to the display image data for displaying on the monitor 16M and are output to the monitor 16M so that the simulated image in which the image obtained when the image is recorded on photographic paper using the display image data is simulated is displayed on the monitor 16. The operator verifies the finishing of the image on the basis of the simulated image displayed on the monitor 16M.

After the completion of the setting of the reading conditions of the time of fine scan for entire frame images, the photographic film 68 is conveyed in the opposite direction to that of the prescan so as to perform the fine scan for each frame image.

At this time, since the photographic film 68 is conveyed in the opposite direction to that of the time of prescan, the fine scan is performed from the final frame to the first frame in order. The fine scan is set so that the conveyance speed is slower than that of the prescan, by this difference amount the resolution at the time of reading becomes high. At the time of prescan since image conditions (for example, a photographed image aspect ratio, a photographing condition such as under, normal, over, and super over, or the like, whether or not a stroboscope photography is executed, and the like) are recognized, reading can be performed on appropriate reading conditions.

The image data read by the line CCD scanner 14 are output to the image memory 44 of the image processing section 16 as well as to the frame ID data issuance device 81. The image data output to the image memory 44 of the image processing section 16 are once stored in the image memory 44, then are provided with every kind of image processing by the color gradation process 46, the hypertone process 48, and the hypersharpness process 50, and are output to the laser printer part 18 as the recording image data.

The display image data of the time after the image processing in which verification is performed are output to and stored in the memory B84. The image processing condition parameters to be converted to the recording image data are output to and stored in the memory C86.

The image data read by the line CCD scanner 14 and output to the frame ID data issuance device 81 are added the frame ID for distinguishing a frame image on a photographic film and are output to and stored in the memory A82.

The recording image data provided with every kind of image processing in the image processing section 16 are output to the laser printer part 18, the laser light modulated according to the recording image data by the laser printer part 18 is irradiated on the photographic paper 62, and the image is recorded on the photographic paper 62 by the scanning exposure so as to be output to the processor section 20. The processor section 20 provides each process of color development, bleaching fixing, water rinsing, and drying for the photographic paper 62 on which an image is recorded by the scanning exposure in the laser printer part 18. By this an image is formed on the photographic paper 62. The photographic paper 62 on which the image is formed is output to the bar code printer 88 as a print, and the bar code representing the frame ID added in the frame ID data issuance device 81 is printed on the reverse face of the print 92. In FIGS. 7 and 8, the laser printer part 18 and the processor section 20 are shown as an output device.

Next, processes of the time of reprinting relative to the first print formed as described above will be explained.

The finishing of all first prints made are verified by the operator. The first print judged as not appropriate in finishing is extracted for reprinting. The operator moves the print 92 made at the time of making first print so that the print 92 (the print to be provided with reprinting) passes through the approximately U shaped recess of the bar code reader 90 shown in FIG. 3. By this the bar code printed on the reverse face of the print 92 is read as shown in FIG. 8, and the image ID of the print 92 can be obtained through the bar code read. When the operator sets the photographic film on which the image to be reprinted is recorded in the line CCD scanner 14, rereading the frame image recorded on the photographic film corresponding to the frame image stored in the memory A82 is performed, and the display image data stored in the memory B84 are output to the monitor 16M. Further, the image processing condition parameters of the time of making the first print corresponding to the frame ID stored in the memory C86 are read out. That is, merely reading the bar code enables easy reading for the frame image of the photographic film to be reprinted, and the image processing condition parameters of the time of making the first print can be read easily.

The operator corrects the image processing condition parameters of the time of making the first print read out from the memory C86 by inputting correction information of the image processing condition parameters in the key board 16K of the image processing section 16 while seeing the display image displayed on the monitor 16M and the print 92 of the time of making the first print. With respect to inputting correction information to the key board 16K, correction for the processing conditions of the image processing of the first print is performed by operating the key corresponding to the density key or the CMY key of the key board 16K while seeing the display image and the first print. For example, judgement is made in such a manner that the density key is added one more, or one CMY key is deducted, while seeing the display image and the first print, and performed is a key input corresponding to a manner that one density key is added, or one CMY key is deducted, or the like, in the key board 16K. The image corrected in the density and/or color according to the key input is redisplayed on the monitor 16M, and when the operator inputs a correction "OK" of the processing conditions of the image processing, the parameter correction information is decided by this "OK" input.

When reprinting is performed, after correction is performed according to the parameter correction information by which the image processing condition parameters read out from the memory C86 are decided, image processing is performed for the image data inputted from the line CCD scanner 14, according to the image processing condition parameters corrected so as to convert the image data to the recording image data.

When the parameter correction information is inputted and the conversion to the recording image data is performed as described above, printing is performed by the output device including the laser printer part 18 and the processor section 20 and the reprinting is completed.

The display image data and the image processing condition parameters may be stored again in the memory B84 and the memory C86, respectively, at the time of reprinting. With respect to the data stored in the memory A82, the memory B84, and the memory C86, the former data may be erased at the time of completion of the reprinting, or desired data may be erased by an operational input of the operator to the key board 16K.

Since the display image data and the image processing condition parameters of the time of making the first print are stored, the same image as that of the time of making the first print can be displayed on the monitor 16M at the time of reprinting, and correction can be performed regarding the processing conditions of the image processing of the time of making the first print. Therefore, there may be no case in which a correction amount of the operator for the first print becomes inappropriate by the difference in processing conditions of image processing as in the prior art.

In the digital laboratory system of the present embodiment, since the display image data are stored in the memory B84, the image data obtained by rereading the photographic film are not necessary at the time of processing of the image verification where the verification for finishing for the image displayed on the monitor 16M at the time of reprinting is performed (until the time when the parameter correction information is verified). Accordingly, reading for an output image and the image processing for the output image which requires processing time can be made as separated processes so as to be applied to a so-called large laboratory containing a large scale processing system.

Since the image processing parameters are stored in the memory C86 instead of output image data stored in the memory C86 as in the first embodiment, the memory capacity of the memory C86 can be reduced.

Although the memory A82, the memory B84, and the memory C86 are employed as respective memories in the embodiments above, an area of a memory may be divided into and used as three areas.

It is possible to employ image characteristic data representing the characteristics of an individual image (for example, compressed image data, density histogram data, or the like), electronic chain mark, or the like as the image ID in the above described embodiments other than a bar code or a frame ID.

According to the present invention as described above, even in the case in which an image recorded on a recording medium is once recorded on a recording medium and then is recorded over again, there are excellent effects that workload can be reduced and appropriate reprinting can be performed efficiently.

What is claimed is:

1. An image processing apparatus, comprising:
   an image ID adding section which adds an image ID, that identifies an image data, to the image data;
   an image processing section which determines a processing condition of predetermined image processing, performs the predetermined image processing on the image data and converts the image data to output image data which includes display image data and recording image data;
   a display section which displays an image on the basis of the display image data;
   a recording section which records an image onto a recording material on the basis of the recording image data;
   a memory section which stores the output image data in accordance with the image ID;
   an image ID recording section which records the image ID that is added by the image ID adding section onto the recording material on which the image is recorded by the recording section;
   an image ID input section for inputting the image ID recorded on the recording material on which the image, which is to be recorded again, is recorded,
   wherein said image ID has associated processing information comprising at least one of: color gradation processing, hypertone processing, and hypersharpness processing.

2. The image processing apparatus of claim 1, wherein the image data is image data that is obtained by reading an image recorded on a recording medium.

3. The image processing apparatus of claim 1, further comprising a control section which, when the image ID is inputted from the image ID input section, outputs the output image data which is stored in correspondence with the inputted image ID in said memory section, the display image data of said output image data being outputted to the display section and the recording image data of said output image data being outputted to the image processing section.

4. The image processing apparatus of claim 3, further comprising an input section for inputting information for amending the processing condition of the predetermined image processing on the basis of an image displayed at the display section, wherein, when the recording image data is inputted, the image processing section amends the recording image data in accordance with the information inputted via the input section, and outputs the recording image data.

5. An image processing apparatus, comprising:
   a reading section which reads an image recorded on a recording medium;
   an image ID adding section which adds an image ID, that identifies an image data, to the image data said image data being obtained by reading the reading section reading the image recorded on the recording medium;
   an image processing section which determines a processing condition of predetermined image processing, performs the predetermined image processing on the image data and converts the image data to output image data which includes display image data and recording image data;
   a display section which displays an image on the basis of the display image data;
   a recording section which records an image onto a recording material on the basis of the recording image data;
   a memory section which stores the processing condition, which the image processing section employed when performing the predetermined image processing, and the display image data in correspondence with the image ID, said image ID having associated processing information comprising at least one of: color gradation processing; hypertone processing, and hypersharpness processing;
   an image ID recording section which records the image ID that is added by the image ID adding section onto the recording material on which the image is recorded by the recording section; and
   an image ID input section for inputting the image ID recorded on the recording material on which the image, which is to be recorded again, is recorded.

6. The image processing apparatus of claim 5, further comprising a control section which, when the image ID is inputted from the image ID input section, outputs the display image data which is stored in correspondence with the inputted image ID in said memory section to the display section and outputs the processing condition which is stored in correspondence with the inputted image ID in said memory section to the image processing section.

7. The image processing apparatus of claim 5, further comprising an input section for inputting information for amending the processing condition of the predetermined image processing on the basis of an image displayed at the display section, wherein, when the image data is inputted and the processing condition is inputted, the image processing section amends the inputted processing condition in accordance with the information inputted via the input section and converts the inputted image data to recording image data on the basis of the amended processing condition.

8. The image processing apparatus of claim 1, wherein the image ID recording section is a printer which prints the image ID, and the image ID input section is a reader which inputs by reading the image ID that was printed.

9. The image processing apparatus of claim 5, wherein the image ID recording section is a printer which prints the image ID, and the image ID input section is a reader which inputs by reading the image ID that was printed.

10. The image processing apparatus of claim 1, wherein the image ID recording section is a character string printer which prints a character string that represents the image ID, and the image ID input section is an input device for inputting the image ID on the basis of the character string that was printed.

11. The image processing apparatus of claim 5, wherein the image ID recording section is a character string printer which prints a character string that represents the image ID, and the image ID input section is an input device for inputting the image ID on the basis of the character string that was printed.

12. The image processing apparatus of claim 1, wherein the display image data stored in the memory section has a lower resolution than the recording image data.

13. The image processing apparatus of claim 5, wherein the display image data stored in the memory section has a lower resolution than the recording image data.

14. The image processing apparatus of claim 5, wherein the image processing apparatus further comprises a display image transmission section which transmits, of the output image data, display image data for displaying the image, and the image ID input device further comprises a display section which displays an image on the basis of the display image data transmitted by the display image transmission section.

15. An image processing apparatus, comprising:
   an image ID adding section which adds an image ID that identifies image data to the image data;
   an image processing section which determines a processing condition of predetermined image processing, performs the predetermined image processing on the image data and converts the image data to output image data;
   a memory section which stores the output image data in correspondence with the image ID;
   an image ID recording section which records the image ID onto a recording material on which an image is recorded by a recording section;
   an image ID input section for inputting the image ID recorded on the recording material on which the image, which is to be recorded again, is recorded; and
   a recording section which records the image onto the recording material on the basis of the output image data that is stored in the memory section in correspondence with the image ID inputted by the image ID input section;
   wherein said image ID has associated processing information comprising at least one of: color gradation processing, hypertone processing, and hypersharpness processing.

16. The image processing apparatus of claim 15, further comprising:
   a display section which displays an image on the basis of display image data for displaying an image, wherein the image processing section converts the image data to the display image data for displaying the image on the basis of the image data, the memory section stores the display image data in correspondence with the image ID, and the display section displays the image on the basis of the display image data which is stored in the memory section.

17. The image processing apparatus of claim 15, wherein the image data is image data obtained by reading the image recorded on the recording medium.

18. The image processing apparatus of claim 15, wherein the image ID recording section is a printer which prints the image ID, and the image ID input section is a reader which inputs by reading the image ID that was printed.

19. The image processing apparatus of claim 15, wherein the image ID recording section is a character string printer which prints a character string that represents the image ID, and the image ID input section is an input device for inputting the image ID on the basis of the character string that was printed.

20. An image output device, comprising:
   an image ID input section which inputs an image ID that identified images data;
   a communication section which acquires output image data by communication, said output image data being stored at an external section in correspondence with the inputted image ID; and
   a recording section which records an image on a recording material on the basis of the output image data acquired by the communication section;
   wherein said image ID has associated processing information comprising at least one of: color gradation processing, hypertone processing, and hypersharpness processing.

21. The image output device of claim 14, further comprising an image display section which displays an image on the basis of the output image data acquired by the communication section.

22. The image output device of claim 20, wherein the image data is image data obtained by reading an image recorded on a recording medium.

23. An image processing system, including an image processing apparatus and the image output device of claim 20, said image processing apparatus comprising:
   an image ID adding section which adds an image ID that identifies image data to the image data;
   an image processing section which determines a processing condition of predetermined image processing, performs the predetermined image processing on the image data and converts the image data to output image data; and
   a memory section which stores the output image data in correspondence with the image ID.

24. The image processing system of claim 23, wherein the image processing apparatus further comprises:
   an image recording section which records an image onto the recording material on the basis of the output image data when the output image data is stored in the memory section; and
   an image ID recording section which records the image ID onto the recording material on which the image is recorded by the recording section.

25. An image processing system, including an image processing apparatus and an image ID input device, said image processing apparatus comprising:
   an image ID adding section which adds an image ID, that identifies image data to the image data;
   an image processing section which determines a processing condition of predetermined image processing, performs the predetermined image processing on the image data and converts the image data to output image data;

a memory section which stores the output image data in correspondence with the image ID;

a communication section which acquires the image ID from an external portion; and a recording section which records an image onto a recording material on the basis of the output image data that is stored in the memory section in correspondence with the acquired image ID, and said image ID input device comprising:

an image ID input section which inputs the image ID; and a transmission section which transmits the image ID to the image processing apparatus;

wherein said ID has associated processing information comprising at least one of: color gradation processing, hypertone processing, and hypersharpness processing.

26. The image processing system of claim 25, wherein the image processing apparatus further comprises an image ID recording section which records the image ID onto the recording material on which the image is recorded.

27. The image processing system of claim 26, wherein the image ID input section inputs the image ID that was recorded by the image ID recording section onto the recording material on which the image was recorded.

28. The image processing system of claim 25, wherein the image data is image data obtained by reading an image recorded on a recording medium.

29. The image processing system of claim 24, wherein the image ID recording section is a printer which prints the image ID, and the image ID input section is a reader which inputs by reading the image ID that was printed.

30. The image processing system of claim 26, wherein the image ID recording section is a printer which prints the image ID, and the image ID input section is a reader which inputs by reading the image ID that was printed.

31. The image processing system of claim 24, wherein the image ID recording section is a character string printer which prints a character string that represents the image ID, and the image ID input section is an input device for inputting the image ID on the basis of the character string that was printed.

32. The image processing system of claim 26, wherein the image ID recording section is a character string printer which prints a character string that represents the image ID, and the image ID input section is an input device for inputting the image ID on the basis of the character string that was printed.

* * * * *